US009806368B2

(12) United States Patent
Wilson

(10) Patent No.: US 9,806,368 B2
(45) Date of Patent: Oct. 31, 2017

(54) FUEL CELL COMPONENTS

(71) Applicant: Intelligent Energy Limited, Loughborough (GB)

(72) Inventor: Antony Richard Wilson, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 14/439,181

(22) PCT Filed: Nov. 6, 2013

(86) PCT No.: PCT/GB2013/052906
§ 371 (c)(1),
(2) Date: Apr. 28, 2015

(87) PCT Pub. No.: WO2014/072705
PCT Pub. Date: May 15, 2014

(65) Prior Publication Data
US 2015/0288019 A1    Oct. 8, 2015

(30) Foreign Application Priority Data

Nov. 7, 2012  (GB) .................................. 1220036.6

(51) Int. Cl.
*H01M 8/24*       (2016.01)
*H01M 8/2465*     (2016.01)
(Continued)

(52) U.S. Cl.
CPC ....... *H01M 8/2465* (2013.01); *H01M 8/0273* (2013.01); *H01M 8/1097* (2013.01);
(Continued)

(58) Field of Classification Search
CPC ... Y02E 60/521; H01M 8/1097; H01M 8/241; H01M 8/2465; H01M 8/0284; H01M 8/0286; H01M 8/0273
See application file for complete search history.

(56) References Cited

U.S. PATENT DOCUMENTS

2004/0220048 A1    11/2004  Leban
2006/0199054 A9*    9/2006  Gallagher ......... H01M 8/04179
                                                              429/434

(Continued)

FOREIGN PATENT DOCUMENTS

GB        2386690 A      9/2003
JP     2007-134248 A     5/2007
(Continued)

OTHER PUBLICATIONS

Great Britain Application No. 1220036.6; Search Report; dated Feb. 20, 2013; 1 page.
(Continued)

*Primary Examiner* — Stewart Fraser
*Assistant Examiner* — Monique Wills
(74) *Attorney, Agent, or Firm* — Baker & Hostetler LLP

(57) ABSTRACT

The invention relates to a strip of fuel cell components comprising a plurality of fuel cell components spaced apart in a first direction and a support structure connected to the plurality of fuel cell components. The plurality of fuel cell components comprise a first surface. The support structure comprises two lateral fold regions between adjacent fuel cell components such that the support structure is foldable in order for the first surfaces of the plurality of fuel cell components to face in the same direction when folded.

14 Claims, 10 Drawing Sheets

(51) Int. Cl.
*H01M 8/1097* (2016.01)
*H01M 8/241* (2016.01)
*H01M 8/0273* (2016.01)
*H01M 8/0284* (2016.01)
*H01M 8/0286* (2016.01)

(52) U.S. Cl.
CPC .......... *H01M 8/241* (2013.01); *H01M 8/0284* (2013.01); *H01M 8/0286* (2013.01)

(56) References Cited

U.S. PATENT DOCUMENTS

| | | | |
|---|---|---|---|
| 2006/0210865 A1 | 9/2006 | Inoue | |
| 2007/0116999 A1 | 5/2007 | Kuramochi et al. | |
| 2009/0068519 A1* | 3/2009 | Sato | H01M 8/04074 |
| | | | 429/493 |

FOREIGN PATENT DOCUMENTS

| | | |
|---|---|---|
| JP | 2009-043465 | 2/2009 |
| JP | 2009-295298 | 12/2009 |
| WO | WO 2011/141852 A | 11/2011 |

OTHER PUBLICATIONS

International Search Report dated Feb. 3, 2014, issued in International patent application PCT/GB2013/052906 filed Nov. 6, 2013.

* cited by examiner

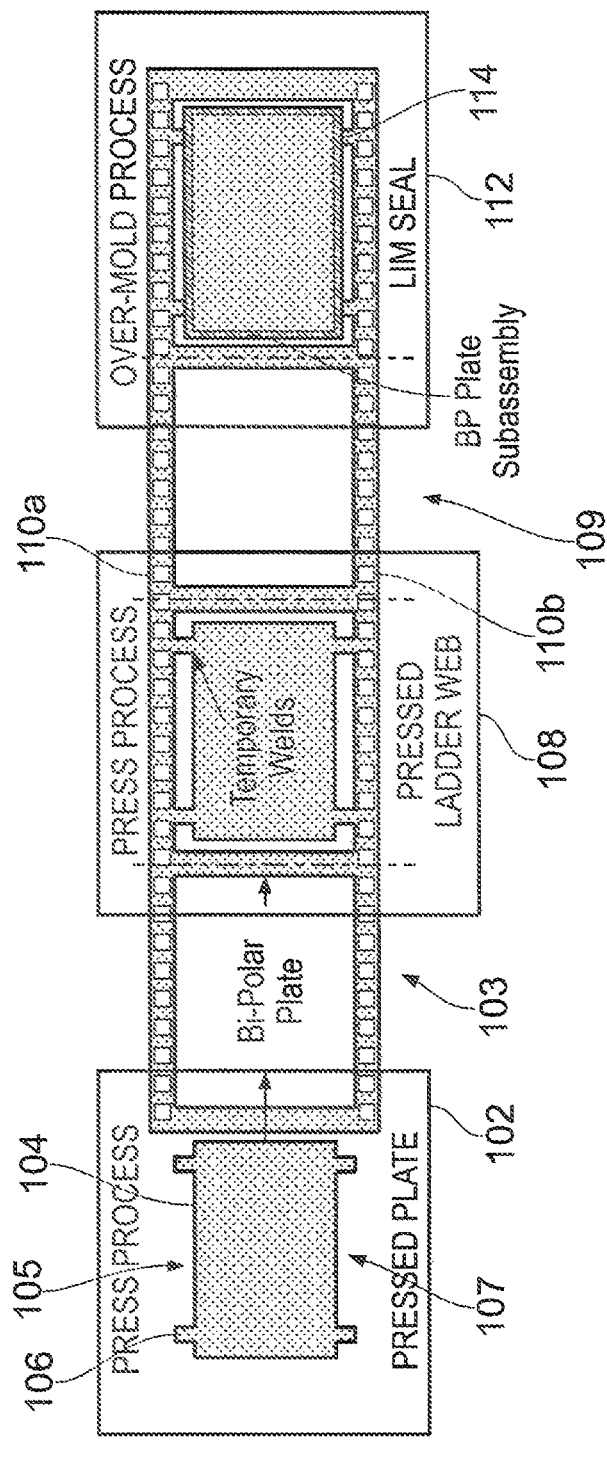

FUEL CELL COMPONENTS

CROSS-REFERENCE TO RELATED APPLICATIONS

This patent application is a Continuation of international patent application PCT/GB2013/052906 filed Nov. 6, 2013, which claims priority to GB patent application 1220036.6 filed Nov. 7, 2012, the disclosures of which are incorporated by reference in their entirety.

The invention relates to the field of fuel cells, and to fuel cell components and a method of assembly of a fuel cell stack in particular.

Electrode or separator plates for fuel cells, that is, in the form of anode or cathode plates, need to meet stringent requirements to avoid or remove any contamination, and typically require a series of different processing steps to be applied before the plates can be assembled into a fuel cell stack. Various types of coatings and other surface treatments may be required. Given that volume production of fuel cell parts requires a large number of such plates to be handled in rapid succession, a solution that enables accurate, economical and reproducible preparation and assembly of fuel cells is required.

In accordance with a first aspect of the invention there is provided a strip of fuel cell components comprising:
  a plurality of fuel cell components spaced apart in a first direction, the plurality of fuel cell components comprising a first surface;
  a support structure connected to the plurality of fuel cell components, the support structure comprising two lateral fold regions between adjacent fuel cell components such that the support structure is foldable in order for the first surfaces of the plurality of fuel cell components to face in the same direction when folded,
  wherein the support structure is releasably or severably connected to the plurality of fuel cell components.

Each of the plurality of fuel cell components may be considered to comprise a common first surface. The first surfaces of the plurality of fuel cell components may be on a first surface of the strip.

The two lateral fold regions of the support structure between adjacent fuel cell components may ensure that the first surfaces of the plurality of adjacent fuel cell components to face in the same direction when folded.

The provision of the support structure that enables all of the cells to face in the same direction when folded provides a simplification for the method of manufacture of the fuel cell. Separate positioning of individual fuel cell components within the stack can be avoided.

The fuel cell components may comprise one or more of a gas diffusion layer or a membrane electrode assembly.

The provision of a releasable or severable support material allows for a more efficient method of manufacture, as the support can be produced using a cheaper, sacrificial material and need not be made from the same material as the fuel cell.

The fuel cell components may be substantially planar.

The plurality of fuel cell components may comprise a plurality of fuel cell assemblies and a plurality of spacing components. A spacing component may be provided between adjacent fuel cell components. Alternatively, the plurality of fuel cell components may comprise a plurality of fuel cell assemblies and a plurality of voids. A void may be provided between adjacent fuel cell components. The spacing components, voids and fuel cell assemblies may be of a similar length in the first direction.

The plurality of fuel cell components may comprise a plurality of fuel cell assemblies. The support structure may comprise two lateral fold regions between adjacent fuel cell assemblies.

The plurality of fuel cell components may each comprise a second surface, which opposes the first surface. The support structure may be foldable such that the first surface of a fuel cell component faces the second surface of an adjacent fuel cell component when the strip is folded.

The support structure may be connected to both sides of the plurality of fuel cell components. Alternatively, the support structure may be connected to only one side of the plurality of fuel cell components.

The support structure may comprise an electrical connection to a fuel cell component to which it is connected. The support structure may comprise an indexing structure.

The plurality of fuel cell components may comprise a first end plate, a plurality of fuel cell assemblies and a second end plate, in that order, extending in the first direction.

The first surface of the first end plate may be an external face of a fuel cell stack. The first surface of the second end plate may be an internal face of a fuel cell stack. The second surface of the first end plate may be an internal face of a fuel cell stack. The second surface of the second end plate may be an external face of a fuel cell stack.

The support structure may comprise only one fold region between the first end plate and the plurality of fuel cell assemblies. The support structure may comprise only one fold region between the second end plate and the plurality of fuel cell assemblies.

There may be provided a device configured to form the strip of fuel cell components.

In accordance with a further aspect of the invention there is provided a method of assembling a fuel cell stack, the method comprising:
  folding a strip of fuel cell components according to any preceding claim in order to locate a plurality of fuel cell components at a build position in order to form a fuel cell stack.

The method may further comprise removing at least a portion of a support structure from the plurality of fuel cell components at the build position. Removing at least a portion of the support structure from the plurality of fuel cell components at the build position may comprise leaving a portion of the support structure comprising an electrical connection connected to the plurality of fuel cell components.

Another strip of fuel cell components is also disclosed. The strip of fuel cell components comprises:
  a plurality of fuel cell components spaced apart in a first direction, the plurality of fuel cell components comprising a first surface;
  a support structure connected to the plurality of fuel cell components, the support structure comprising two lateral fold regions between adjacent fuel cell components such that the support structure is foldable in order for the first surfaces of the plurality of fuel cell components to face in the same direction when folded.

Another strip of fuel cell components is also disclosed. The strip of fuel cell components comprises:
  a plurality of fuel cell components spaced apart in a first direction;
  an indexing structure connected to the plurality of fuel cell components, the indexing structure configured to define the position of one of the plurality of fuel cell components in the first direction;

wherein the indexing structure comprises a different material to the plurality of fuel cell components.

The indexing structure can enable the positioning of fuel cell components at build points within a fuel cell stack to be performed more easily, more reproducibly or more reliably.

The provision of the indexing structure also allows the transfer of fuel cell subcomponents held on a carrier to a fuel cell plate to be performed more easily, more reproducibly or more reliably. The provision of an indexing structure of a different material allows for a fuel cell stack to be produced more cheaply as the indexing material need not be made from the same, typically expensive, material as fuel cell plates.

The indexing structure may be releasably or severably connected to the plurality of fuel cell components. The releasably or severably connection of the indexing structure can assist in providing an indexing structure of a different material to the fuel cell plates.

The plurality of fuel cell components may comprise a plurality of fuel cell assemblies. A fuel cell assembly may comprise a fuel cell plate. The plurality of fuel cell components may comprise a first end plate, a plurality of fuel cell assemblies and a second end plate, in that order extending in the first direction. Providing end plates on the indexing material can further ease the assembly process of the fuel cell stack.

The indexing structure may comprise a plurality of indentations or holes for engaging with an indexor in order to define the position of one of the plurality of fuel cell components.

The indexing structure may be connected to the plurality of fuel cell components by at least one spot weld.

The indexing structure may comprise a lateral fold region between adjacent fuel cell components.

The indexing structure may comprise a plurality of electrically conductive tracks that are insulated from one another.

According to a further aspect of the invention there is a fuel cell stack comprising a folded strip of fuel cell components as defined above.

There is also disclosed a method of assembling a fuel cell stack, the method comprising:
  indexing the strip of fuel cell components according to any preceding claim in order to locate a fuel cell component at a build position.

The method may further comprise removing the indexing structure from the fuel cell component at the build position.

The indexing structure may comprise a lateral fold region between adjacent fuel cell components. The method may further comprise folding the indexing structure at the lateral fold regions in order to locate a plurality of fuel cell components at the build position.

There is also disclosed a method of assembling a fuel cell stack, the method comprising:
  locating a first strip of partial fuel cell components over a second strip of partial fuel cell components; and
  fan folding the first and second strips of partial fuel cell components together in order to assemble a fuel cell stack.

Such a method provides a simple and convenient way to assemble a fuel cell stack as separate positioning of individual fuel cell components within the stack can be avoided.

Fan folding the first and second strips of partial fuel cell components together may comprise locating a partial fuel cell component that is in a first region of the first strip adjacent to a partial fuel cell component that is in a corresponding region of the second strip in order to define a complete fuel cell. In this way, individual fuel cells can be reliably and consistently constructed within the fuel cell stack.

One or both of the strips of partial fuel cell components may comprise a support structure. Such support structures may have two lateral fold regions between adjacent partial fuel cell components. A spacing element may be located between the two lateral fold regions that are between adjacent partial fuel cell components. The step of fan folding the first and second strips of partial fuel cell components together may comprise causing the partial fuel cell components of the first strip and second strip to contact each other through the spacing element. Providing such spacing elements can provide for a simplified method of assembly as a partial fuel cell component in the first strip can be adjacent to a partial fuel cell component in the second strip on both sides when folded, and vice versa.

There is also disclosed a fuel cell stack comprising:
  a first strip of partial fuel cell components; and
  a second strip of partial fuel cell components;
  wherein the first and second strips of partial fuel cell components are located one over the other in a fan folded orientation in order to define the fuel cell stack.

A partial fuel cell component that is in a first region of the first strip may be located adjacent to a partial fuel cell component that is in a corresponding region of the second strip in order to define a complete fuel cell.

The first strip of partial fuel cell components may comprise a support structure connected to the partial fuel cell components. Additionally or alternatively, the second strip of partial fuel cell components may comprise a support structure connected to the partial fuel cell components.

One or both of the support structures may comprise two lateral fold regions between adjacent partial fuel cell components. A spacing element may be located between the two lateral fold regions that are between adjacent partial fuel cell components. A spacing element may have an opening that is configured to allow components to contact each other through the thickness of the strip. In this way, a simplified arrangement of components on the strip can be used as the spacing elements can ensure that partial fuel cell components in the first strip are adjacent to a partial fuel cell component in the second strip on both sides when folded, and vice versa.

For example, one side of the partial fuel components in the first strip can be directly adjacent to the second strip, and the other side of the partial fuel components in the first strip can be exposed to the second strip through the opening in the spacing element.

The first and/or second strip of partial fuel cell components may comprise one or a plurality of electrically conductive tracks for providing an electrical connection to one or more of the fuel cells in the fuel cell stack from externally of the stack. The electrically conductive track may be associated with any support structure disclosed herein. The electrically conductive track or tracks may extend in a direction along the length of the strip. The plurality of electrically conductive tracks may each have a node for external connection at one end and may be connected to a fuel cell at the other end. Different electrically conductive tracks may be connected to different fuel cells in the fuel cell stack, and may be individually addressable by the associated nodes. The plurality of nodes may be located at the same end of the strip, optionally on an external connector frame.

The partial fuel cell components of the first strip and the second strip may together comprise one or more of: a first electrode; a membrane, a second electrode, a cathode gas diffusion layer (which collectively may be referred to as a four layer membrane electrode assembly), an indexing structure (which may comprise a first indexing structure and a second indexing structure), a shim, a gasket, an anode gas diffusion layer and a bipolar plate.

The partial fuel cell components of the first strip may comprise one or more of: a first electrode; a membrane, a second electrode, a cathode gas diffusion layer (which collectively may be referred to as a four layer membrane electrode assembly), a first indexing structure and a second indexing structure. The partial fuel cell components of the second strip may comprise one or more of: a shim, a gasket, an anode gas diffusion layer and a bipolar plate.

The second strip may comprise a current collector plate at one end and an external connector frame at the other end. A node that is electrically connected to the current collector plate may be provided on the external connector frame. The node may be for external connection to the fuel cell stack.

Embodiments of the present invention may be better understood with reference to the accompanying drawings, in which:

FIGS. 1a and 1b show a process for manufacturing a fuel cell;

FIGS. 1a and 1b show schematically a process 100 for manufacturing a fuel cell. FIG. 1 is used to describe how the provision of a support structure allows a fuel cell stack to be constructed from a strip of fuel cells that are aligned in the same direction when the strip is folded such that the fuel cells form a stack.

Figure 1B:
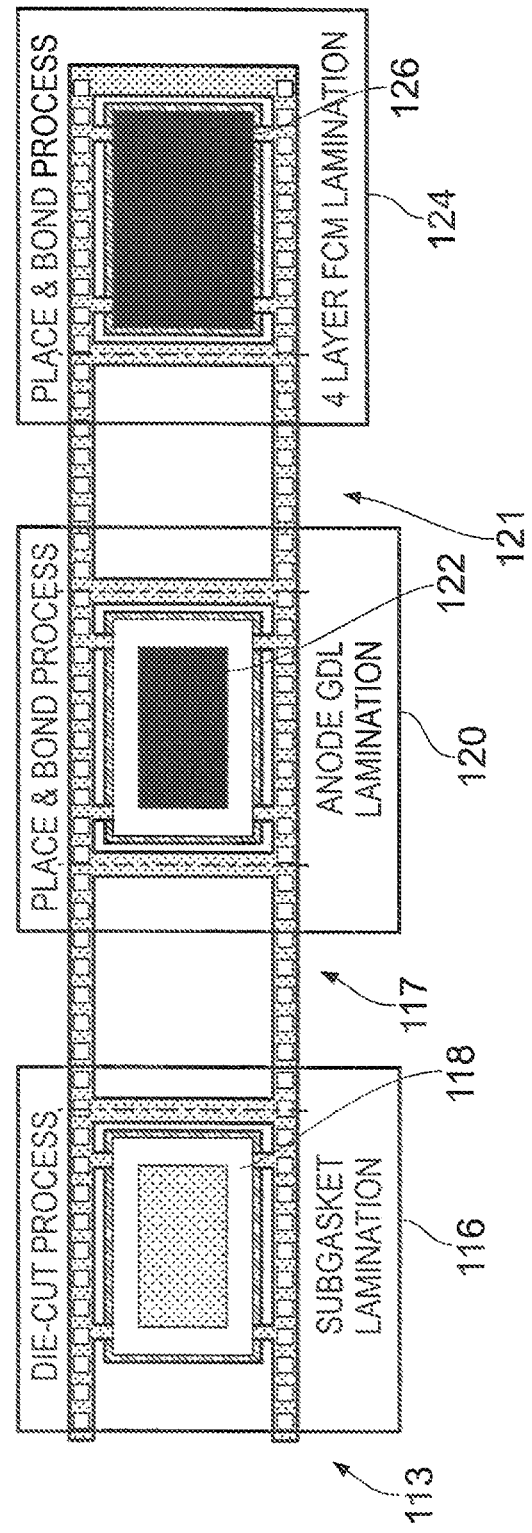

FIG. 1 is broken down into a number of occupied frames 102, 108, 112, 116, 120, 124. The occupied frames 102, 108, 112, 116, 120, 124 show successive operations for the formation of a fuel cell. The occupied frames 102, 108, 112, 116, 120, 124 are each separated from one another by empty frames 103, 109, 113, 117, 121. The empty frames will be discussed in further detail with relation to FIG. 2.

In each occupied frame 102, 108, 112, 116, 120, 124, the fuel cell is illustrated such that the cell has a left side edge 105 and a right side edge 107 in the plane of the cell. For clarity, equivalent features in the various occupied frames 102, 108, 112, 116, 120, 124 of FIG. 1 are only labelled in the frame in which they are first discussed.

In a first frame 102, a bipolar plate 104 is shown. The bipolar plate 104 may be a pressed plate. The bipolar plate 104 is substantially planar. The bipolar plate 104 has a weld point 106 adjacent to each of its corners. Two weld points 106 are positioned on the left side edge 105 of the bipolar plate 104 and two weld points 106 are positioned on the right side edge 107 of the bipolar plate 104. The weld points 106 are configured to be welded to a separate support structure such as an indexing track using a spot welding technique. Alternatively, the support structure may be configured to clip on to the 'weld points'. As such, the term 'weld point' should be construed broadly to encompass any site configured to be severably or removably coupled with an additional structure. A "weld point" may also be referred to as a "connection point".

In a second frame 108, the bipolar plate 104 has been welded to a left side indexing structure 110a that runs along the length of the left side edge 105 of the bipolar plate 104 and to a right side indexing structure 110b that runs along the length of the right side edge 107 of the bipolar plate 104 in a first direction. The first direction is generally parallel with the side edges 105, 107 of the bipolar plate 104 and an axial direction of the indexing structures 110a, 110b.

The left and right side indexing structures 110a, 110b are examples of support structures that may be used to couple multiple fuel cells together. In addition to the support capability, the indexing structures can provide the additional benefit of enabling alignment of the fuel cells and their components. The left side indexing structure 110a is severably, or releasably, connected to the bipolar plate 104 at the weld points 106 on the left side edge 105 of the bipolar plate 104. The right side indexing structure 110b is severably, or releasably, connected to the bipolar plate 104 at the weld points 106 on the right side edge 107 of the bipolar plate 104.

The indexing structures 110a, 110b are configured to define the position of one of the plurality of fuel cell components in the first direction. The indexing structure allows manufacturing equipment to track the position of fuel cell components more easily more reproducibly and/or more reliably, so that correct spacing between components can be maintained. In this way, the provision of the indexing structure allows for improved automated handling fuel cell plates by alleviating some of the difficulties associated with the positioning of individual plates within a fuel cell stack.

The indexing structures 110a, 110b comprise a plurality of indentations or holes for engaging with an indexor (not shown in the drawings) in order to define the position of one of the plurality of fuel cell components. The manufacturing equipment may comprise an electronic camera and image recognition software so as to identify the position of the indexing structures 110a, 110b and the relative position of fuel cell components, such as bipolar plates 104. Such an arrangement can provide for a cheaper, quicker and/or more accurate process for manufacturing a fuel cell or fuel cell stack.

In the example shown in FIG. 1, the indexing structures 110a, 110b may be used to provide automated recognition of the position of fuel cell components with reference to the support structure. The indexing material can therefore be used to simplify the construction of fuel cells, or to improve the performance of automated techniques that construct fuel cells. The use of an indexing structure in the improved formation of a fuel cell stack will be described further below with reference to FIG. 2.

The indexing structures 110a, 110b can be formed of a different type of material to the bipolar plate 104. For example, the indexing structures 110a, 110b may be formed of mild steel or polyethylene naphthalate (PEN). Providing the indexing structures 110a, 110b as a different type of material from the bipolar plate 104 can reduce the cost of materials used in the manufacture of the bipolar plate 104. Indeed, the additional cost of the extra indexing structures 110a, 110b may not be significant through suitable choice of materials. The indexing structures 110a, 110b may be made from a less costly material than the bipolar plate 104 as it can have less stringent requirements, such as electrical conductance characteristics.

Alternatively, it may be convenient in some applications for the left and right side indexing structures 110a, 110b to be the same as each other, or at least to be made of the same material as each other, in order to further reduce the complexity of manufacture.

In a third frame 112, an over-mold process is used to apply a liquid injection molding (LIM) seal 114 around the extremity of the bipolar plate 104. The over-mold process allows a polymer to be applied to a metal substrate that extends beyond the die of the mold whilst avoiding unwanted extrusion of the polymer seal material.

In a fourth frame 116, a die cut process is used to form a subgasket 118 and a lamination technique is used to apply the subgasket 118 to the bipolar plate 104.

In a fifth frame 120, an anode gas diffusion layer 122 is placed within the subgasket 118 on the surface of the bipolar plate 104 and bonded in place using a lamination technique. Welding, bonding or the use of a retaining means such as an adhesive are examples of bonding methods that may be suitable.

In a final, sixth frame 124, a four layer fuel cell membrane lamination 126 is applied and bonded over the anode gas diffusion layer and subgasket. The four layer cell membrane 126 comprises the following layers: a first electrode; a membrane, a second electrode; and a cathode gas diffusion layer. The arrangement of subcomponents illustrated in the sixth frame 124 is referred to as a fuel cell. Such a fuel cell can be positioned on top of other fuel cells to provide a fuel cell stack.

It will be appreciated from the description that follows that the fuel cell shown in the sixth frame 124 of FIG. 1 can be provided by more than one strip of partial fuel cell components.

Figure 2:
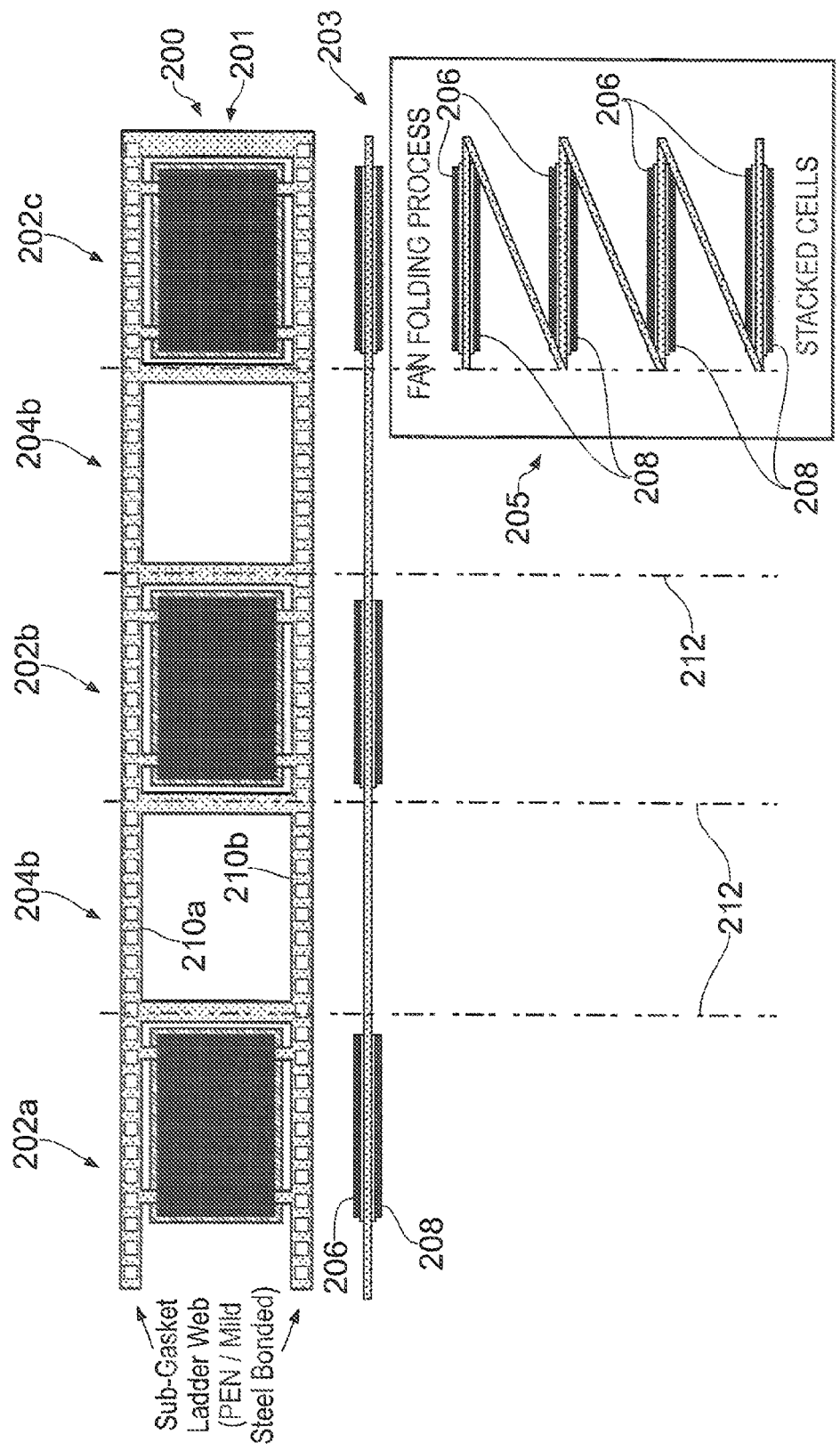
FIG. 2 shows a schematic of a strip comprising a plurality of fuel cells.

FIG. 2 illustrates a strip 200 comprising three fuel cells 202a, 202b, 202c similar to the one illustrated in the last frame of FIG. 1b. Three views of the strip 200 are illustrated: a top down view 201 (similar to the view in FIG. 1); an extended side-on view 203; and a folded side-on view 205.

From the top down view 201, it can be seen that the fuel cells 202a, 202b, 202c are all severably welded to a left side support structure 210a and a right side indexing structure 210b. The left and right side indexing structures 210a, 210b are similar to those applied by the process illustrated in FIG. 1. The indexing structures 210a, 210b are an example of support structures. It will be appreciated that a support structure may be provided that does not comprise indexing material.

The strip 200 comprises a succession of occupied and empty frames. The occupied frames each comprise a fuel cell 202a, 202b, 202c. The fuel cells 202a, 202b, 202c consist of fuel cell components. The fuel cells 202a, 202b, 202c are spaced apart in a first direction. The indexing structures 210a, 210b extend in the first direction and connect the plurality of fuel cell 202a, 202b, 202c. The plurality of fuel cell 202a, 202b, 202c comprise a first surface that faces in the same direction when the strip of fuel cells 202a, 202b, 202c is laid flat.

The empty frames 204a, 204b do not comprise a fuel cell 202a, 202b, 202c, but may be considered to comprise indexing structures 210a, 210b, as the indexing structures extend in the first direction adjacent to both the fuel cells 202a, 202b, 202c and to voids that make up the empty frames 204a, 204b. The length of the indexing structures 210a, 210b in the occupied frames is similar to that of the indexing structures 210a, 210b in the empty frames 204a, 204b.

In the extended side-on view 203, an anode side of each of the fuel cells 202a, 202b, 202c and a cathode side of each of the fuel cells 202a, 202b, 202c can be seen on the respective first surfaces 206 and second surfaces 208 of the fuel cells 202a, 202b, 202c. This arrangement of the fuel cells is different from the example shown in FIG. 1, in which both the anode and cathode gas diffusion layers are provided on a single side of the bipolar plate. It will be appreciated that the processes and strips of components described herein can be implemented irrespective of how each individual fuel cell is constructed.

Fold lines 212 are superimposed on the strip 200 as seen in the top down view 201 and the extended side-on view 203. The fold lines 212 are positioned at the intersection of the occupied and empty frames; the fold lines 212 represent lateral fold regions between the adjacent fuel cells 202a, 202b, 202c and empty frames 204a, 204b. The indexing structures 210a, 210b comprise two lateral fold regions between adjacent fuel cells 202a, 202b, 202c. The support structure 210a, 210b comprising two lateral fold regions 212 between adjacent fuel cell components 202a, 202b, 202c means that the support structure is foldable such that the first surfaces of the plurality of fuel cell components face in the same direction when the strip 200 is folded.

In the folded side view 205, the strip 200 is fan folded so as to form a stack of cells. From the folded side view 205 it can be seen that by the provision of empty frames 204a, 204b between the fuel cells 202a, 202b, 202c, the first surfaces 206 of the plurality of fuel cells 202a, 202b, 202c face in the same direction when the indexing structure is folded. Similarly, second surfaces 208 of the fuel cells 202a, 202b, 202c also face in the same direction when the indexing structure is folded. As the orientation of the anode and cathode sides of the cells is therefore the same for all of the plates, a simplified method of construction can be employed to form the stack as all of the plates can be easily aligned.

In some examples, the fuel cells 202 are connected to only one support or indexing structure 210a, 210b. That is, only one side of the cells 202 may be connected to a support or indexing structure. In some examples, a strip is provided in which each frame between two indexing structures 210a, 210b has a fuel cell 202. That is, initially there are no empty frames. The strip of fuel cells can then be separated into two strips, with each strip comprising one of the support structures 210a, 210b and alternate fuel cells 202. In this way, each of the two strips has alternate empty frames in the spaces that have been vacated by the fuel cells 202 that are part of the other strip.

Figure 3:
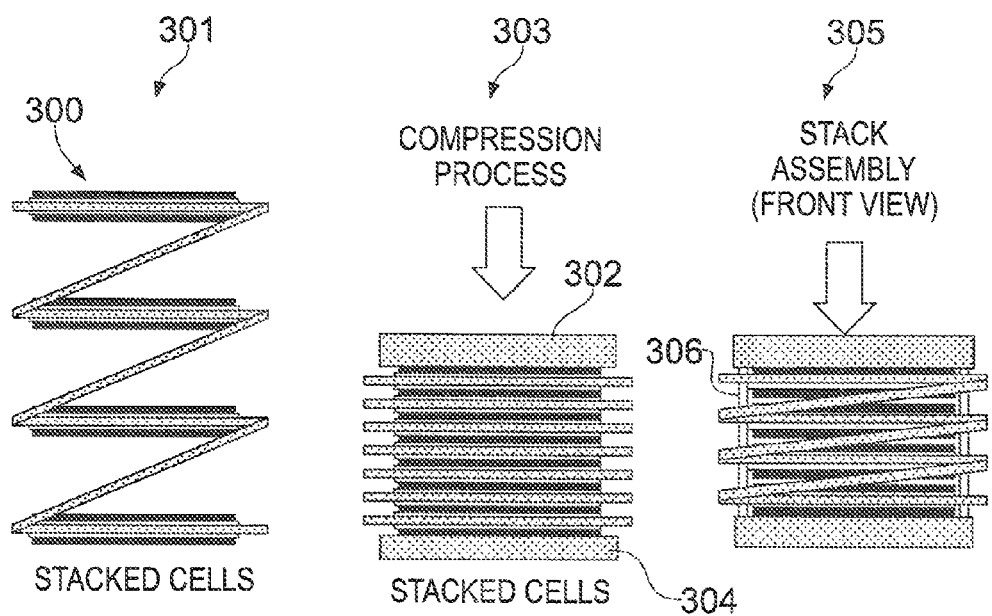
FIG. 3 shows three side views of a schematic of a folded strip.

FIG. 3 illustrates three side views of a folded strip 300. A fan folded side view 301 shows the same arrangement illustrated in the folded side view 205 of FIG. 2. A second view 303 shows the folded strip under compression, forming a fuel cell stack. A third view 305 shows the fuel cell stack secured with tie bars 306.

In the second view 303, a first end plate assembly 302 and a second end plate assembly 304 are provided. The first end plate assembly 302 is in contact with the first surface of the top fuel cell. The second end plate assembly 304 is in contact with the second surface of the bottom fuel cell. In addition to the features illustrated in the second view 303, insulator frames of material may be provided at the respective ends of the strip 300 to separate and provide electrical insulation between the fuel cells and the end plates 302, 304. The insulator frames may be provided by the support structure. That is, the support structure may be retained in the final fuel cell stack and extend, at the respective ends of the strip 300 of fuel cells, to form an insulating layer between the strip 300 and the end plates 302, 304. Alternatively, the insulator frames may be provided by nylon sheets that are connected to the support structures at weld points on the sheets.

In the second view 303, external compression is applied in a direction normal to the plane of the fuel cells of the stack in order for the seals and gaskets between the fuel cells to function correctly.

In the third view 305, tie bars 306 have been used to secure the stack in compression. The external compressive force is therefore no longer required. At this stage in the production of the fuel cell stack, the indexing structures can be removed. Alternatively, the indexing structures could be removed before or during compression. This removal can be achieved by, for example, melting or cutting the welds that link the fuel cells to the indexing structures. A laser trimming process may be employed to sever the welds that link the bipolar plates and the indexing strips. However, in some embodiments, some or all of the indexing material may be retained in the end product and not be severed from the fuel cells. The retained indexing material may be used to provide additional features to the cell, as will be apparent from the examples provided in FIGS. 4 and 5.

In some embodiments of the invention, a carrier may be employed to carry at least some subcomponents of a fuel cell. The use of carriers can simplify the manufacture of a fuel cell comprising multiple structures. Combinations of a carrier and indexing structures can further improve the reproducibility of component placement by automated systems and enable an increase in production speed.

Figures 4A, 4B:
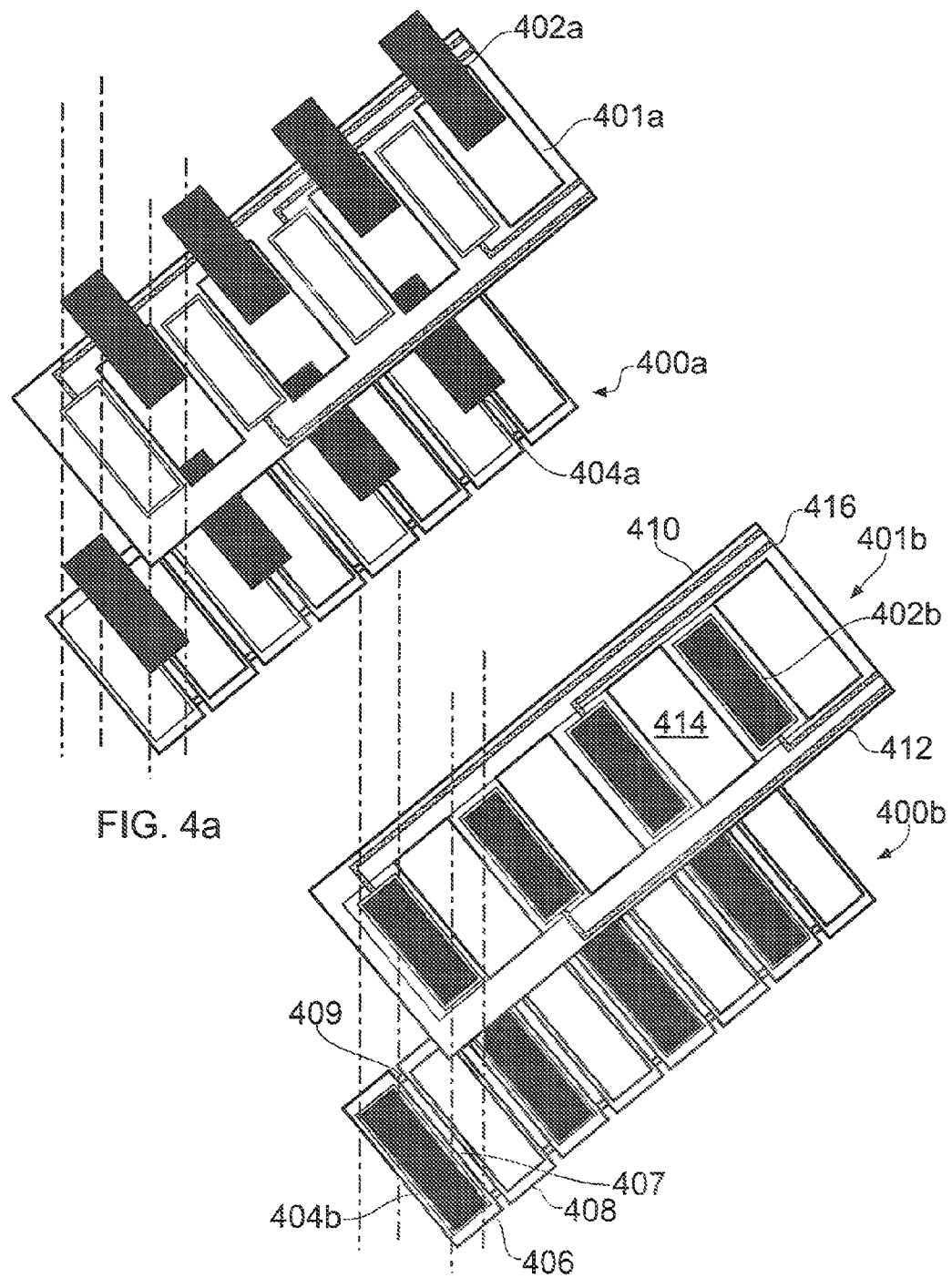
FIGS. 4a and 4b show a schematic of a strip and a carrier.

FIGS. 4a and 4b illustrate a strip 400a, 400b of fuel cell subcomponents and a carrier 401a, 401b. The carrier 401a, 401b is laid over the strip 400a, 400b before the strip 401a, 401b is fan folded to form the fuel cell stack. In this way, the fuel cell stack alternately comprises, in a direction through the thickness of the fuel cell subcomponents, a region of the strip 400a, 400b and a region of the carrier 401a, 401b.

The strip 400a, 400b of fuel cell subcomponents is an example of a first strip of partial fuel cell components. The carrier 401a, 401b is an example of a second strip of partial fuel cell components. It will be appreciated from the description that follows that the strip 400a, 400b and carrier 401a, 401b can be located one over the other, and then fan folded together in order to assemble a fuel cell stack.

Two views of the strip 400a, 400b and carrier 401a, 401b are shown. In the view shown in FIG. 4a, four layer membrane electrode assemblies 402a (similar to those of FIG. 1) are shown separate from the carrier 401a. Also, anode gas diffusion layers 404a are shown separate from the strip 400a in FIG. 4a. In FIG. 4b, the four layer membrane electrode assemblies 402b are laminated on to the carrier 401b, and the anode gas diffusion layers (GDL) 404b are laminated on to the strip 400b. Other than these details, the structure of the carrier 401a, 401b and the strip 400a, 400b are similar in FIGS. 4a and 4b. The features of the carrier 401b and the strip 400b are discussed in further detail below with reference to FIG. 4b.

The strip 400b comprises a plurality of partial fuel cells 406, each partial fuel cell comprising a plurality of subcomponents including in this example a shim and gasket, an anode gas diffusion layer and a bipolar plate. The construction of the partial fuel cells 406 is similar to the fuel cells shown in the fifth frame of FIG. 1.

Spacing elements 408 are provided between the adjacent partial fuel cells 406. The spacing elements 408 are located between two lateral fold regions that are between adjacent partial fuel cells 406. That is, partial fuel cells 406 and spacing elements 408 alternate along the length of the strip.

Each spacing element 408 has an opening that allows components to contact each other through the thickness of the strip. In this way, a simplified arrangement of components on the strip can be used as the spacing elements 408 can ensure that each partial fuel cell component in the strip 400b is adjacent to the fuel cell components in the carrier 401b, and vice versa.

In some embodiments, the spacing elements 408 define gaps or voids between partial fuel cells 406. That is, the spacing elements 408 may not comprise any components of a fuel cell. In other embodiments, including those for air-breathing fuel cell stacks, the spacing elements 408 may comprise a cathode shim together with a second cathode gasket (optionally provided with adhesive) that forms a seal when the strip 400b is folded-up to define the fuel cell stack. That is, the spacing elements 408 may comprise components of a fuel cell, and therefore may be considered as a partial fuel cell component.

The spacing elements 408 have similar dimensions to the partial fuel cells 406 and may be formed from the same sheet of material as the plate/shim and gasket 400a, 400b, indexing structure or any fuel cell subcomponent. At least part of the spacing elements 408 and the partial fuel cells 406 may be made from a continuous laminated material that is profiled in form to define parts of both the spacing elements 408 and the partial fuel cells 406.

Each of the partial fuel cells 406 is connected to an adjacent spacing element 408 along a fold line at the intersection of the fuel cells 406 and spacing elements 408. Therefore, two fold lines are provided between adjacent fuel cell components. In some examples, the spacing elements can themselves comprise fuel cell components. In such examples, the spacing elements and the partial fuel cells do not comprise common components. As such, common components are not provided in adjacent frames of the strip.

The fold line may be considered to pass through a fold region 407. In this example, the fold region 407 is provided by cutting away the majority of material between the fuel cells 406 and spacing elements 408. The position of the fold region 407 may be located using indexing material (not shown) that can be provided on the strip 400a, 400b or carrier 401a, 401b and extend normal to the first direction along a length of the strip 400, 400b. Two coupling portions 409 are provided between adjacent fuel cells 406 and spacing elements 408. The coupling portions 409 can be considered to perform the function of shims.

Alternatively, the fold region may comprise a region of weakened material joining the fuel cells 406 and spacing elements 408. Such a join, which may be referred to as a 'living hinge' can be designed to withstand repeated folding and unfolding steps, sufficient to subject a stack of plates to fan folding. The line of weakened material may be provided by a series of perforations.

The carrier 401b comprises a four layer membrane electrode assembly 402b, a first indexing structure 410 down a first side of the four layer membrane electrode assembly 402b, and a second indexing structure 412 down a second side for the four layer membrane electrode assembly 402b. It will be appreciated that either or both of the strip 400a, 400b and carrier 401a, 401b can be considered as providing the indexing structure.

A partial fuel cell component that is in a first region of the strip 400b is located adjacent to a partial fuel cell component that is in a corresponding region of the carrier 401b in order to define a complete fuel cell. That is, complete fuel cells are provided when the strip 400b is located next to the carrier 401b and fan folded to define a stack. The first region of the strip 400b may be considered as components that are between adjacent fold lines (for example a fuel cell 406 in FIG. 4b), or it may be considered as components that are either side of a fold line (for example a fuel cell 406 and a spacing element 408 in FIG. 4b).

The membrane electrode assemblies (MEAs) 402b are fixed in place on the carrier material and separated from other MEAs 402b by voids 414. The voids 414 are examples of spacing elements. It will be appreciated that the voids 414 in the carrier 401b do not necessarily have to align with the spacing elements 408 in the strip 400b.

The indexing structures 410, 412 each comprise a plurality of electrically conductive tracks 416 that are insulated from one another. The electrically conductive tracks 416 are each in electrical contact with either anode or cathode side of a cell to facilitate either (i) monitoring of cell performance or (ii) provision of current collection. Each of the electrically conductive tracks 416 extend along a respective length of one of the indexing structures 410, 412. The electrically conductive tracks 416 can be used to draw off current from the fuel cells when they are assembled into a stack. It will be appreciated that in an alternative embodiment, one or more or all of the fuel cells could share a conductive track.

Figure 5A:
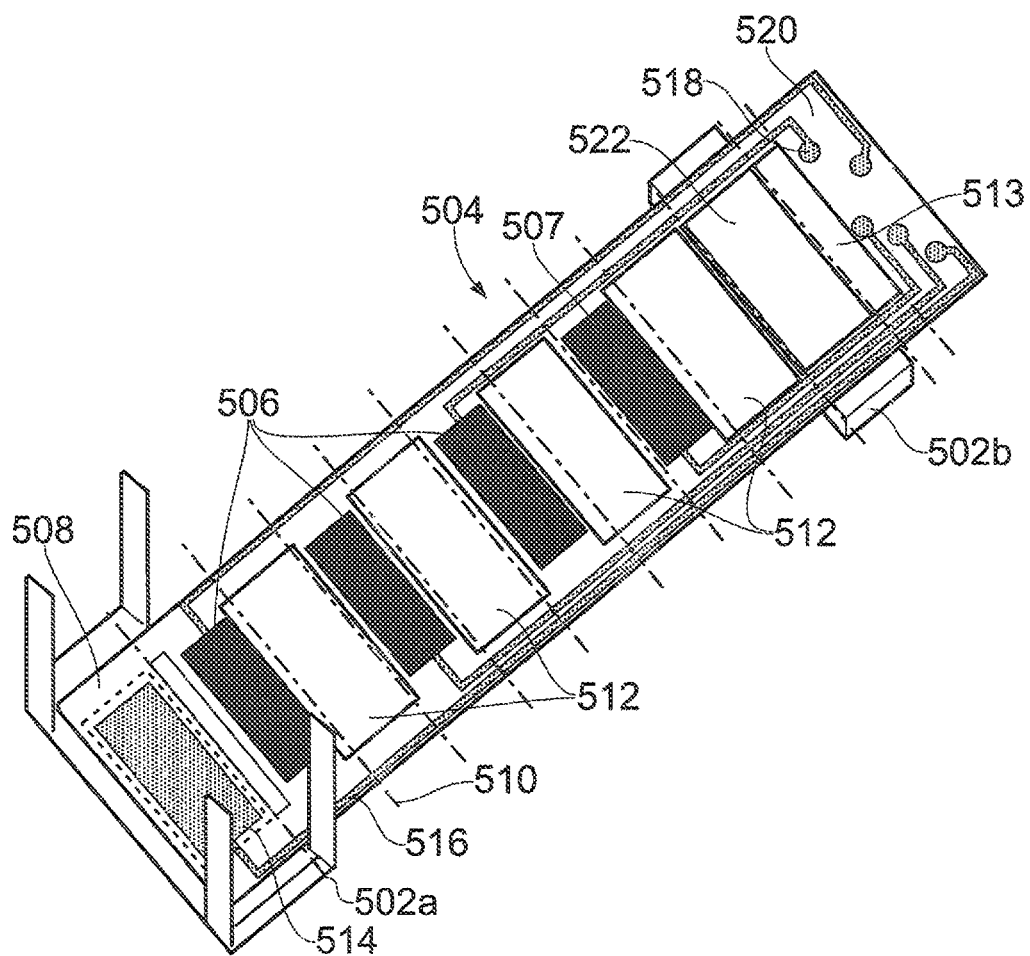
FIGS. 5a and 5b show a schematic of a strip and a case.
Figure 5B:
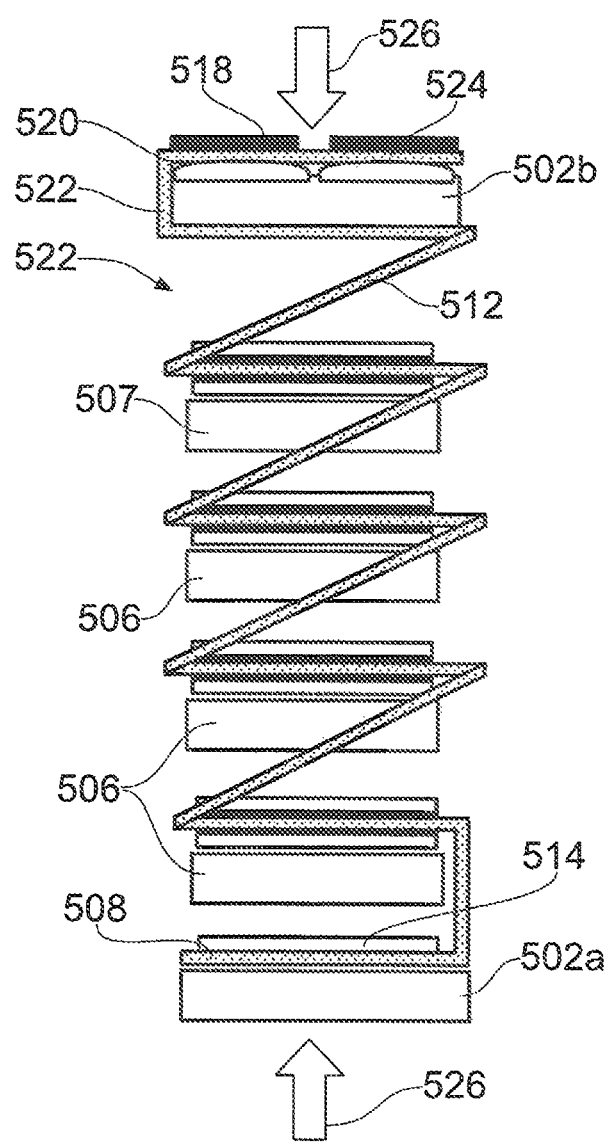

FIGS. 5a and 5b show a fuel cell case 502a, 502b and a strip 504 of fuel cells 506 with similarities to the structure formed by the combination of the strip and carrier in FIG. 4. In addition to the features of the strip and carrier of FIG. 4, the strip 504 of FIG. 5 comprises a current collector plate 514, an external connector frame 520 and an insulator frame 522. In this example, the base 502a of the case comprises a first end plate and the top 502b of the case comprises a second end plate.

A first insulating frame 508 of the strip 504 of fuel cells 506 has been placed in a base of the case 502a. A fuel cell stack may be formed by folding the strip 504 of fuel cells 506, 507 along lateral fold lines 510 that separate the fuel cells 504 and empty frames 512. The empty frames 512 are examples of spacing elements. A lateral fold line 510 is provided at the extremities of each of the empty frames 512. Once the fuel cells 506, 507 are all within the base 502a, a lid of the case 502b may be placed on top of the folded fuel cells in order to complete the fuel cell stack.

The strip 504 of FIG. 5 differs from the strip shown in FIG. 4 in a number of ways. For example, a current collector plate 514 is provided on the first insulating frame of the strip 504 and an external connector frame is provided at the other end of the strip 504. The conductive plate 514 is insulated from the first end plate provided in the base 502a of the case by the first insulating frame 508. The current collector plate 514 is coupled to a conductive track 516 that runs along a support structure 518 to the external connector frame 520 at the other end of the strip 502. The fuel cells 506 are also coupled to similar conductive tracks 516 for current monitoring. The conductive tracks 516 terminate at nodes 518 on the external connector frame 520. The current collector plate 514, conductive tracks 516 and nodes 518 may comprise a material such as copper. As can be seen from FIG. 5b, the nodes 518 are exposed for external connection when the stack is constructed.

The fuel cell 507 nearest to a portion of the strip 502 that will form the top of the stack may be referred to as the top fuel cell 507. The top fuel cell 507 is adjacent to an optional spacing element (empty frame) 512. The spacing element 512 is adjacent to an insulator frame 522 that comprises an electrically insulating material. The insulator frame 522 separates the lid 502b, which forms a second end plate, from the top fuel cell 507 when the stack is folded. The insulator frame 522 is separated from the external connector frame 520 by an end spacing element 513. However, the function of the end spacing element 513 differs from that of the rest of the spacing elements 512; the lateral folds at the extremities of the end spacing element 513 are each folded 90 degrees with respect to the adjacent frames 520, 522. The end spacing element 513 allows the connector frame 520 to be positioned on the exterior of the second end plate that is built into the top of the case 502b. The surface of the insulator frame 522 shown in FIG. 5a does not face in the same direction as the surface of the connector frame 520 when the strip is folded.

FIG. 5b illustrates a fan folded view of the strip 504 seen in FIG. 5a. The distance in the direction through the stack is exaggerated for clarity. The angle between adjacent fuel cells 506 and the carrier portions of empty frames 512 approaches 180 degrees (where the fuel cell thickness is small compared to its width) when the strip 504 is folded.

Pressure pads 524 may be provided on a surface of connector frame 520 that opposes the surface on which the conductive nodes 518 are provided. The pressure pads 524 can provide a pressure absorbing layer between the second end plate provided in the top 502b of the case and the connector frame 520. The provision of the pressure pads 524 may prevent damage to the stack when a compressive force 526 is applied to the fuel cell stack and can offer compliance and maximise or increase contact between electrically conductive surfaces. The compressive force 526 is required to engage and seal via compression the cells and gaskets of the various cell cells 506, 507 within the stack and to enable final stack assembly, as is known in the art.

Figure 6:
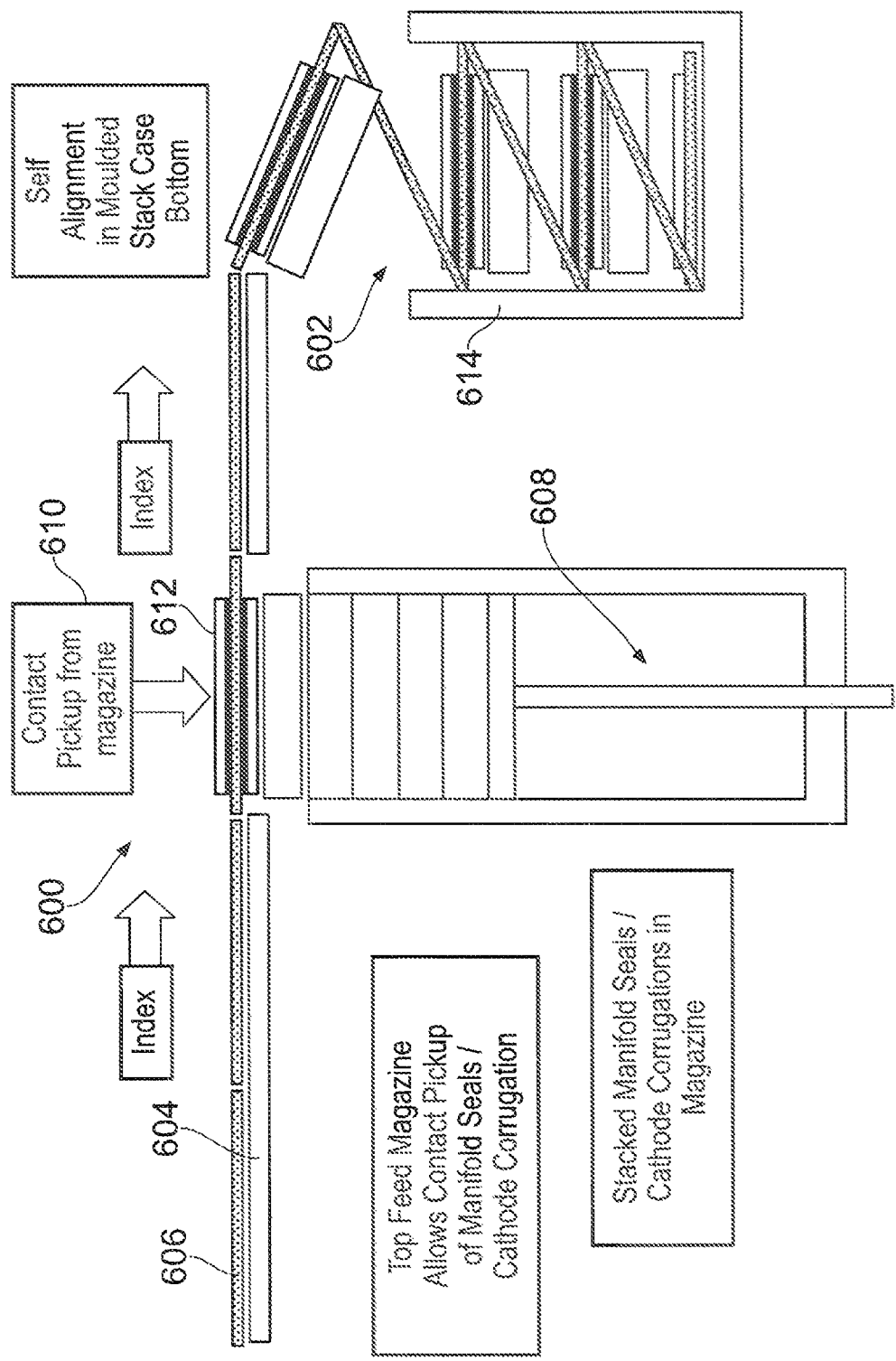
FIG. 6 shows a schematic of a portion of a fuel cell production line.

FIG. 6 shows a portion of a production line 600 for a fuel cell stack 602. The production line 600 comprises a conveyor belt 604.

The conveyor belt 604 may have an indexor (not shown) that is configured to interact with indexing on a support structure 606 associated with a plurality of fuel cell as fuel cell subcomponents. The support structure 606 comprises a number of frames. The production line in this example further comprises a bottom application mechanism 608 and a top application mechanism 610. The bottom application mechanism 608 is configured to apply structures such as manifold seals to the underside of the support structure 606 situated on the conveyor belt 604. The top application mechanism 610 can place fuel cell subcomponents on the top of the support structure 606 so as to form a complete fuel cell 612 in a frame of the support structure 606. It will be appreciated that in some examples only one application mechanism may be required. The combination of the production line 600 and the features of the strip of fuel cell component described previously reduces the physical space required to build a fuel cell stack, enables a significant amount of automation to be provided, and can improve the reproducibility and accuracy of the construction of a fuel cell stack.

The conveyor belt 604 can deposit fuel cells 612 formed by the application mechanisms 608, 610 into a case 614. The fuel cells 612 may be aligned by a process of self-alignment in the case 614 such that a first surface of each of the fuel cells is properly aligned. The first surface of each of the fuel cells in the stack can face in the same direction as the same first surfaces of the fuel cells when they are laid flat in the strip.

It will be appreciated that any feature of an embodiment described herein may be combined with a feature or features of any other embodiment where it is practicable to do so. For example, the production line of FIG. 6 could be used with a plurality of strips of partial fuel cell components such as the two that are shown in FIG. 5.

Figure 7:
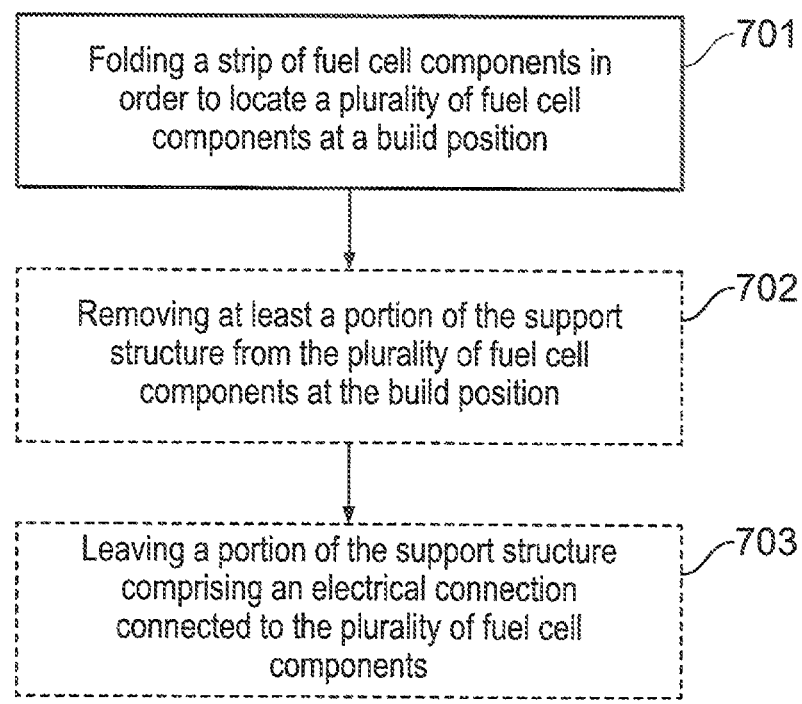
FIG. 7 shows a method of assembling a fuel cell stack.

FIG. 7 illustrates a method of assembling a fuel cell stack. The method comprises a first step 701 of folding a strip of fuel cell components in order to locate a plurality of fuel cell components at a build position. The method also comprises an optional second step 702 of removing at least a portion of the support structure from the plurality of fuel cell components at the build position. Removing at least a portion of the support structure from the plurality of fuel cell components at the build position may comprise a third step 703 of leaving a portion of the support structure connected to the plurality of fuel cell components. The remaining portion of the support structure can provide for an electrical connection to be made to the stack. In this way, the support structure can both hold fuel cell components during construction of the fuel cell stack and provide electrical connections to the stack.

Figure 8:
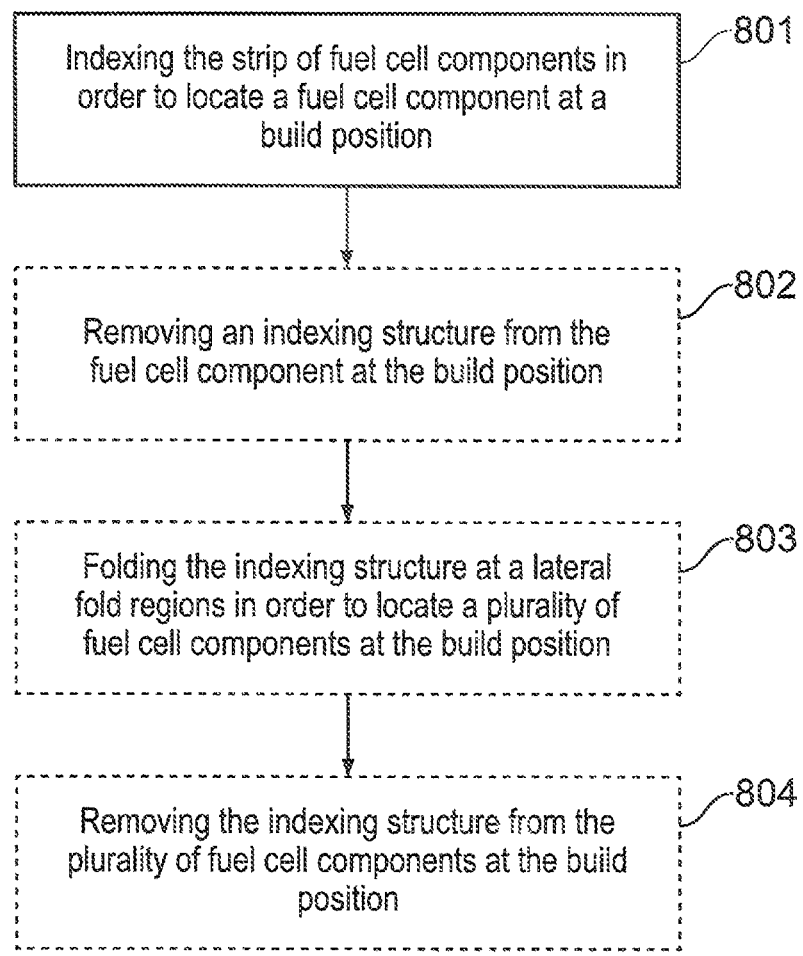
FIG. 8 shows another method of assembling a fuel cell stack.

FIG. 8 illustrates a method of assembling a fuel cell stack. The method comprises a first step 801 of indexing a strip of fuel cell components that comprise an indexing structure in order to locate a fuel cell component at a build position. The use of the indexing structure allows for a simplified method of assembling a fuel cell stack. The use of the indexing structure may also allow for the more accurate or reproducible placement of fuel cell stack components at the build position.

The method also comprises an optional second step 802 of removing the indexing structure from the fuel cell component at the build position.

The method may also comprise a third step 803 and a fourth step 804. The indexing structure of the fuel cell stack can comprise a lateral fold region between adjacent fuel cell components. At the third step 803, the indexing structure can be folded at the lateral fold regions in order to locate a plurality of fuel cell components at the build position. At the fourth step 804, the indexing structure can be removed from the plurality of fuel cell components at the build position. The removal of the indexing structure may allow for the final dimensions of the fuel cell stack to be reduced.

Figure 9:
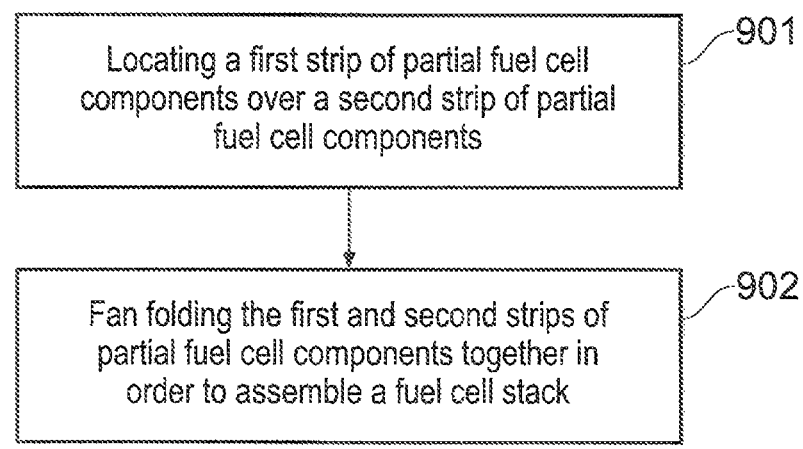
FIG. 9 shows a further method of assembling a fuel cell stack.

FIG. 9 illustrates a method of assembling a fuel cell stack. The method comprises a first step 901 of locating a first strip of partial fuel cell components over a second strip of partial fuel cell components. The first strip and second strip together may define a plurality of fuel cells.

The method continues with fan folding the first and second strips of partial fuel cell components together in order to assemble a fuel cell stack at step 902.

The method of FIG. 9 provides a convenient, accurate and reproducible means of assembling a fuel cell stack.

The invention claimed is:

1. A strip of fuel cell components comprising:
   a plurality of fuel cell components spaced apart in a first direction, the plurality of fuel cell components comprising a first surface;
   a support structure connected to the plurality of fuel cell components, the support structure comprising two lateral fold regions between adjacent fuel cell components such that the support structure is foldable in order for the first surfaces of the plurality of fuel cell components to face in the same direction when folded, wherein the support structure is releasably or severably connected to the plurality of fuel cell components; wherein the support structure comprises an electrical connection to a fuel cell component to which it is connected.

2. The strip of fuel cell components of claim 1, wherein the fuel cell components are substantially planar.

3. The strip of fuel cell components of claim 1, wherein the plurality of fuel cell components comprises a plurality of fuel cell assemblies and a plurality of spacing components or voids, and wherein a spacing component or void is provided between adjacent fuel cell components.

4. The strip of fuel cell components of claim 3, wherein the plurality of fuel cell components comprises a plurality of fuel cell assemblies and the support structure comprising two lateral fold regions between adjacent fuel cell assemblies.

5. The strip of fuel cell components of claim 1, wherein the plurality of fuel cell components each comprise a second surface, which opposes the first surface, and wherein the support structure is foldable such that the first surface of a fuel cell component faces the second surface of an adjacent fuel cell component when the strip is folded.

6. The strip of fuel cell components of claim 1, wherein the support structure is connected to both sides of the plurality of fuel cell components.

7. The strip of fuel cell components of claim 1, wherein the support structure is connected to only one side of the plurality of fuel cell components.

8. The strip of fuel cell components of claim 1, wherein the support structure comprises an indexing structure.

9. The strip of fuel cell components of claim 1, wherein the plurality of fuel cell components comprises: a first end plate, a plurality of fuel cell assemblies and a second end plate, in that order extending in the first direction.

10. The strip of fuel cell components of claim 9, wherein the first surface of the first end plate is an external face of a fuel cell stack and the first surface of the second end plate is an internal face of a fuel cell stack.

11. The strip of fuel cell components of claim 9, wherein the support structure comprises only one fold region between the first end plate and the plurality of fuel cell assemblies; and/or
   the support structure comprises only one fold region between the second end plate and the plurality of fuel cell assemblies.

12. A method of assembling a fuel cell stack, the method comprising:
   folding a strip of fuel cell components according to any preceding claim in order to locate a plurality of fuel cell components at a build position in order to form a fuel cell stack.

13. The method of claim 12, further comprising:
   removing at least a portion of a support structure from the plurality of fuel cell components at the build position.

14. The method of claim 13, wherein removing at least a portion of the support structure from the plurality of fuel cell components at the build position comprises leaving a portion of the support structure comprising an electrical connection connected to the plurality of fuel cell components.

* * * * *